Aug. 21, 1928.
C. C. FARMER
1,681,577
FLUID PRESSURE BRAKE
Filed Oct. 19, 1926
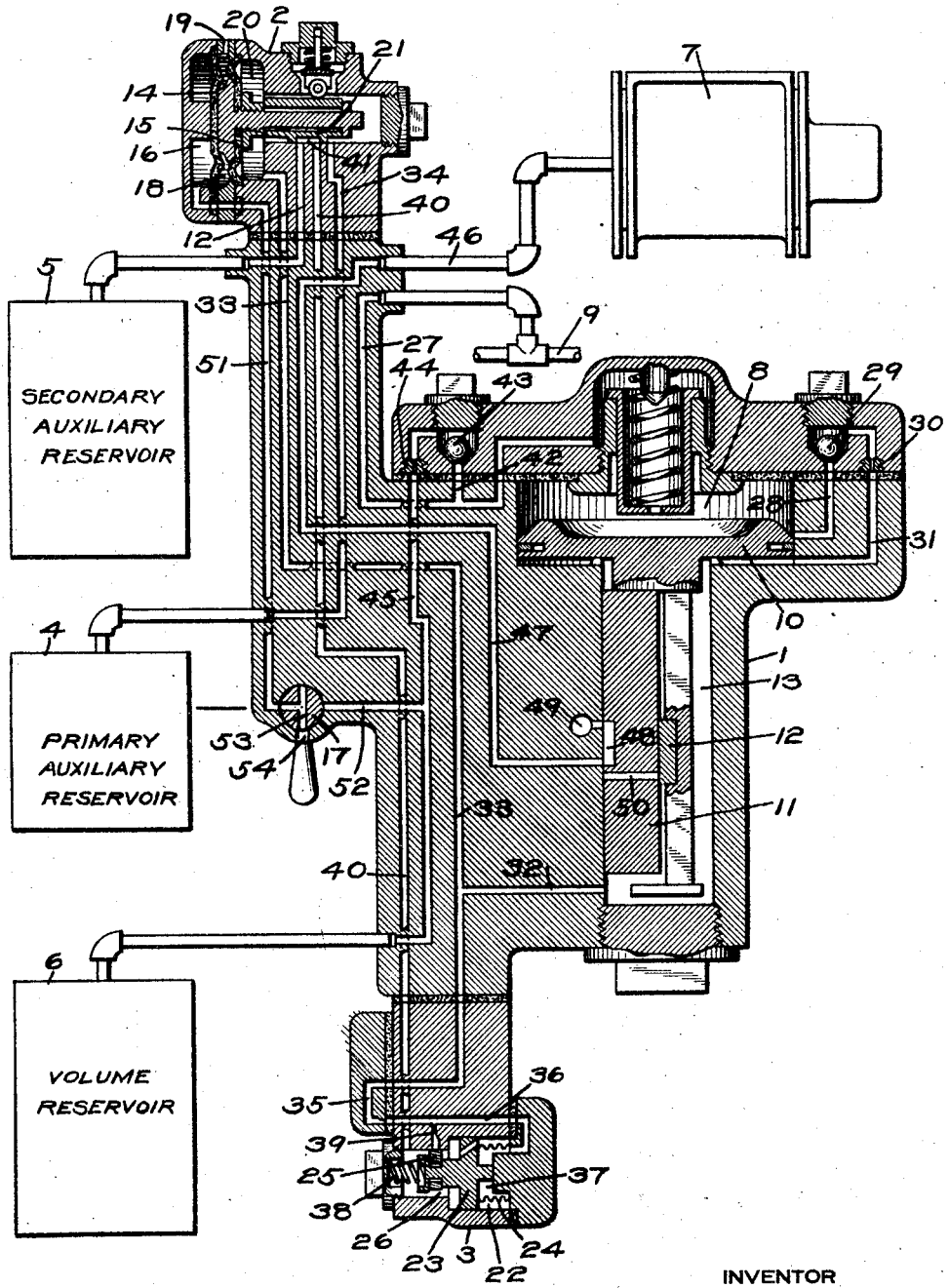
INVENTOR
CLYDE C. FARMER
BY *Wm. M. Cady*
ATTORNEY Patented Aug. 21, 1928.

1,681,577

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed October 19, 1926. Serial No. 142,621.

This invention relates to fluid pressure brakes and more particularly to the type in which fluid is supplied from an auxiliary reservoir in effecting an application of the brakes.

The usual standard type of brake equipment is designed to produce 3¼ pounds absolute pressure in the brake cylinder for each pound reduction in the brake pipe pressure.

If a brake equipment is designed upon a different basis, as for instance to produce 2½ pounds absolute pressure in the brake cylinder for each pound reduction in the fluid under pressure in the brake pipe, then of course a different brake cylinder pressure will be secured for the same brake pipe reduction than would be the case with the standard equipment.

If equipments designed for different pressure ratios, as described above, are mixed in a train, it would be desirable, particularly in descending a grade, to obtain a uniform braking force on each vehicle and the same maximum service braking force on each vehicle with the same degree of brake pipe reduction.

The principal object of my invention is to provide means whereby a brake equipment designed for one pressure ratio may be adjusted to operate on another pressure ratio when desired.

In the accompanying drawing, the single figure is a diagrammatic sectional view of a brake equipment embodying my invention.

As shown in the drawing, the equipment may comprise a triple valve device 1, having associated therewith a change-over portion 2, a check valve portion 3, a primary auxiliary reservoir 4, a secondary auxiliary reservoir 5, a volume reservoir 6, and a brake cylinder 7.

The triple valve device 1 may comprise a casing having a piston chamber 8 connected to the usual brake pipe 9 and containing a piston 10 adapted to control a main slide valve 11 and an auxiliary slide valve 12 contained in a valve chamber 13.

The change-over portion 2 may comprise a casing containing two diaphragm heads 14 and 15, the chamber 16 at one side of the diaphragm head 14 being connected by a passage 51 to a cock 17, by the operation of which, said chamber may be connected either to atmosphere or to the volume reservoir 6, according to the position of said cock. Intermediate the diaphragm heads 14 and 15 is a second chamber 18 connected to atmosphere through a port 19 and at the outer face of diaphragm head 15 is a third chamber 20 connected to the slide valve chamber 13 of the triple valve device 1, through passages 33 and 32.

A slide valve 21 is operatively connected to the diaphragm heads 14 and 15 and is movable by said diaphragm heads to either one of two positions. In one position, the primary auxiliary reservoir 4 is connected to the valve chamber 13 of the triple valve device 1, while in the second position, the secondary auxiliary reservoir 5 is connected to the valve chamber 13. Whichever reservoir is connected to the valve chamber 13 of the triple valve device 1, then acts as the auxiliary reservoir of the equipment.

The check valve portion 3 may comprise a casing having a chamber 22 containing a piston head 23 connected to a bellows diaphragm 24, said head being adapted to operate a slide valve 25 contained in valve chamber 26. The slide valve 25 controls communication through which the secondary auxiliary reservoir 5 is normally charged from the valve chamber 13 of the triple valve device 1.

The primary auxiliary reservoir 4 and secondary auxiliary reservoir 5 differ in volume. The secondary auxiliary reservoir 5 is of the volume required with the standard brake equipment, while the primary auxiliary reservoir 4 is of a lesser volume than that of the secondary auxiliary reservoir 5, and thus with the same volume of brake cylinder will produce a less brake cylinder pressure for a given reduction in the auxiliary reservoir pressure.

In operation, to initially charge the brake equipment, the brake pipe 9 being charged with fluid under pressure in the usual manner, fluid from said brake pipe flows through passage 27 into piston chamber 8 of the triple valve device 1, thence through passage 28, past ball check valve 29, through a restricted choke 30 and passage 31 into valve chamber 13, and from chamber 13 through passages 32 and 33 to the chamber 20 of the change-over portion 2. The plug valve 17 being in its normal position, as shown in the drawing, connects the chamber 16 of the change-over portion 2 to atmosphere through passage 51, cavity 53 in the valve 17 and port 54 so that pressure building up in chamber 20 and acting against the diaphragm head 15 shifts said head and slide valve 21 to the position shown in the drawing, in which passage 34 is connected to chamber 20, so that the primary auxiliary reservoir 4 is charged with fluid under pressure.

Fluid under pressure from valve chamber 13 flows through passages 32, 33, 35, and 36, into chamber 37 on the face of diaphragm head 23 of the check valve device 3 and moves said head and slide 25, against the pressure of spring 38, to a position in which slide valve 25 opens communication from passage 36 through a restricted port 39 to valve chamber 26. Said valve chamber being connected to the secondary auxiliary reservoir 5 through passage 40, cavity 41 in slide valve 21 of the change-over portion 2, and passage 12, the secondary auxiliary reservoir becomes charged with fluid from valve chamber 13 of the triple valve device 1.

When the secondary auxiliary reservoir 5 becomes charged to substantially the same pressure as that in valve chamber 13, the pressure of spring 38 moves diaphragm 23 and slide valve 25 so as to cut off communication from passage 36 to valve chamber 26.

The volume reservoir 6 is charged with fluid under pressure from the brake pipe 9, through passages 27 and 42, past ball check valve 43 through a restricted port 44 and thence through a passage 45.

In the charging and release position of the triple valve device 1, the brake cylinder 7 is connected to atmosphere through pipe 46, passage 47, cavity 48 in the main slide valve 11 of the triple valve device 1 and exhaust port 49.

A service application of the brakes may be effected by making a gradual reduction in the pressure of the fluid in the brake pipe, which causes the triple valve piston 10 and slide valves 11 and 12 to be shifted to the usual service position, in which fluid under pressure from the primary auxiliary reservoir 4, which communicates with valve chamber 13, flows through port 50, in the main slide valve 11, and passage 47 and pipe 46 to the brake cylinder 7, thus applying the brakes. When the pressure in valve chamber 13 and the primary auxiliary reservoir 4 becomes reduced to a degree slightly less than the pressure of the brake pipe fluid in piston chamber 8, the triple valve piston 10 is shifted back to service lap position, in which a further flow of fluid under pressure from valve chamber 13 to the brake cylinder 7 is cut off in the usual manner.

The pressure obtained in the brake cylinder 7, during the above service application, depends upon the volume of the primary auxiliary reservoir 4 as compared to the volume of the brake cylinder 7. It will be assumed, as an example, that the ratio of volumes is such that 2½ pounds absolute pressure is obtained in the brake cylinder for each pound reduction in the pressure of fluid in the brake pipe.

The secondary auxiliary reservoir 5 is of such volume with respect to the volume of the brake cylinder 7 that, when it is used as the auxiliary reservoir instead of the primary auxiliary reservoir 4, the same brake cylinder pressure will be obtained for a given reduction in brake pipe pressure as is obtained with the usual standard equipment, for example, 3¼ pounds absolute brake cylinder pressure for each pound reduction in the brake pipe pressure.

If it is desired to employ the brake equipment with brake equipment of the usual standard in order to obtain the same brake cylinder pressure for a given reduction in brake pipe pressure, the plug valve 17 is turned clockwise 90 degrees so that passage 51, from chamber 16 of the change-over portion 2, is connected to passage 52 from the volume reservoir 6, through port 53 in the plug valve 17, and the connection of port 53 to the atmospheric vent 54 is cut off.

Chamber 16 being connected to the volume reservoir 6, fluid at volume reservoir pressure acts on diaphragm head 14 which, having a greater area than diaphragm head 15, is shifted against the pressure in chamber 20 acting on the diaphragm head 15. The slide valve 21, being controlled by the operation of said diaphragm heads, is thus also shifted to a position in which passage 12 from the secondary auxiliary reservoir 5 is connected to chamber 20 in the change-over portion 2, while the primary auxiliary reservoir 4 is connected through passage 34, cavity 41 in slide valve 21 of the change-over portion 2, and passage 40 with the valve chamber 26 of the check valve portion 3.

When the secondary auxiliary reservoir 5 is connected to valve chamber 13 of the triple valve device it is charged with fluid under pressure from the brake pipe in the same manner as heretofore described for charging the primary auxiliary reservoir 4, while the primary auxiliary reservoir 4 is charged with fluid under pressure by operation of the check valve portion 3.

When a service application of the brakes is made with the secondary auxiliary reservoir 5 connected to the valve chamber 13, the pressure of the fluid obtained in the brake cylinder 7, for a given reduction in the pressure of the fluid in the brake pipe, is the same as obtained with the standard brake equipment.

During the above service application of the brakes, caused by a reduction in the fluid under pressure in the brake pipe 9, the ball check valve 43 prevents a similar reduction in the pressure in the volume reservoir 6 and chamber 16 of the control portion 2. Even though said check valve may leak a slight degree, the volume of reservoir 6 is such as to prevent said leakage from causing a sufficient decrease in pressure therein to permit the pressure of fluid in chamber 20, acting on diaphragm head 15, to shift diaphragm heads 14 and 15 and slide valve 21 to the position in which the primary auxiliary reservoir 4 is cut in.

Having now described my invention, what I claim as new and desire to secure by Letters Patent, is:—

1. In a fluid pressure brake, the combination with a brake pipe, brake cylinder, and a valve device subject to the opposing pressures of the brake pipe and a chamber for controlling the supply of fluid to the brake cylinder, or reservoirs having different volumes and means for connecting one or another of said reservoirs to said chamber.

2. In a fluid pressure brake, the combination with a brake pipe, brake cylinder, and a valve device subject to the opposing pressures of the brake pipe and a chamber for controlling the supply of fluid to the brake cylinder, of two auxiliary reservoirs having different volumes, a valve device having one position for connecting one reservoir to said chamber and another position for connecting the other reservoir to said chamber, and means for controlling the operation of said valve device.

3. In a fluid pressure brake, the combination with a brake pipe, brake cylinder, and a valve device subject to the opposing pressures of the brake pipe and a chamber for controlling the supply of fluid to the brake cylinder, of two auxiliary reservoirs having different volumes, a valve device having one position for connecting one reservoir to said chamber and another position for connecting the other reservoir to said chamber, and manually controlled means for controlling the operation of said valve device.

In testimony whereof I have hereunto set my hand.

CLYDE C. FARMER.